United States Patent [19]
Studer et al.

[11] Patent Number: 6,134,969
[45] Date of Patent: Oct. 24, 2000

[54] AUTOMATICALLY COMPENSATABLE DEVICE FOR MEASURING A PRESSURE DIFFERENCE

[75] Inventors: Werner Studer, Oberägeri; Josef Jandl, Zug; Stefan Städelin, Merenschwand, all of Switzerland

[73] Assignee: Electrowatt Technology Innovation AG, Zug, Switzerland

[21] Appl. No.: 09/342,002

[22] Filed: Jun. 28, 1999

[30] Foreign Application Priority Data

Aug. 31, 1998 [EP] European Pat. Off. .............. 98116412

[51] Int. Cl.[7] .............................. G01L 19/04; G01F 25/00
[52] U.S. Cl. ................................ 73/708; 73/1.35; 73/1.16
[58] Field of Search ..................................... 73/1.35, 1.16, 73/1.62, 1.63, 1.43, 708, 861.42

[56] References Cited

U.S. PATENT DOCUMENTS 3,509,767  5/1970  Greer .
4,476,707  10/1984  Burns et al. .
4,679,567  7/1987  Hanlon et al. ........................... 128/675
4,754,651  7/1988  Shortridge et al. .

FOREIGN PATENT DOCUMENTS 2 651 318 A2  3/1991  France .
03 242 515  10/1991  Japan .
WO 90/05289  5/1990  WIPO .

*Primary Examiner*—Eric S. McCall
*Assistant Examiner*—Abdullahi Aw-Musse
*Attorney, Agent, or Firm*—Proskauer Rose LLP

[57] ABSTRACT

An automatically compensatable device for measuring a pressure difference includes a housing (4) with pressure feed passages (20; 23), a sensor element (6) with electrical connections (13) which is arranged in the housing (4), a valve (7) which is integrated in the housing (4) and which has a closure portion (32) by which a pressure difference across the sensor element (6) can be short-circuited and actuator means (34, 31) arranged in the housing (4) for triggering a movement of the closure portion (32). The automatically compensatable device permits quiet operation.

17 Claims, 3 Drawing Sheets

6,134,969

AUTOMATICALLY COMPENSATABLE DEVICE FOR MEASURING A PRESSURE DIFFERENCE

BACKGROUND OF THE INVENTION

1. Field of the Invention

The invention relates to an automatically compensatable device for measuring a pressure difference.

Such devices are advantageously used for detecting the through-flow of a flow medium, wherein the detected through-flow serves for example for regulating the feed flow of fresh air to a room or for power accounting purposes.

2. Description of the Prior Art

Devices of that kind can advantageously be used in a system with a variable volume flow, in which the zone temperature is regulated by varying the air volume flow. This process which is known by the term VAV (variable air volume) is generally used for cooling purposes when the feed air temperature is lower than the desired temperature.

The use of such devices however is not limited to the heating, ventilation and air-conditioning art. Depending on the respective configuration of the device involved, it is possible to detect differential pressures in gaseous or liquid flow media.

A device of this kind is known (WO 90/05289 A1) which includes a differential pressure sensor, a valve and a circuit having a plurality of operational amplifiers. That device is so designed that the differential pressure sensor can be short-circuited by the valve.

U.S. Pat. No. 3,509,767 also discloses a device in which a differential pressure across an aperture can be detected by a differential pressure sensor. The device has a plurality of valves which are actuable in such a way that the differential pressure sensor can be short-circuited in relation to a differential pressure applied thereto.

Known devices of that kind are relatively loud and have a plurality of components such as a sensor, a valve, a valve actuating assembly, an electronic system and connecting elements which have to be installed on site at a measurement location. The known devices therefore require at the location of installation a relatively high level of fitment expenditure and installation space and they are also relatively costly and susceptible to trouble.

SUMMARY OF THE INVENTION

The object of the present invention is to provide an automatically compensatable device for measuring a pressure difference, which is quiet and reliable and can be inexpensively installed in a very small space.

In accordance with the invention, there is provided an automatically compensatable device for measuring a pressure difference, comprising:

- a housing which has a first pressure feed passage and a second pressure feed passage, wherein the housing has a first connecting opening for a flow medium which is connected to the first pressure feed passage and a second connecting opening which is connected to the second pressure feed passage;
- a sensor element with electrical connections, wherein the sensor element is disposed in the housing and is arranged between the first pressure feed passage and the second pressure feed passage in such a way that a pressure difference between the first connecting opening and the second connecting opening can be detected by the sensor element;
- a valve disposed in the housing and having a closure portion by which a pressure difference across the sensor element can be short-circuited; and
- actuator means arranged in the housing and having electrical connections, for triggering a movement of the closure portion.

BRIEF DESCRIPTION OF THE DRAWINGS

Embodiments of the invention are described in greater detail hereinafter with reference to the drawings, in which.

DESCRIPTION OF THE PREFERRED EMBODIMENTS

Figure 1:
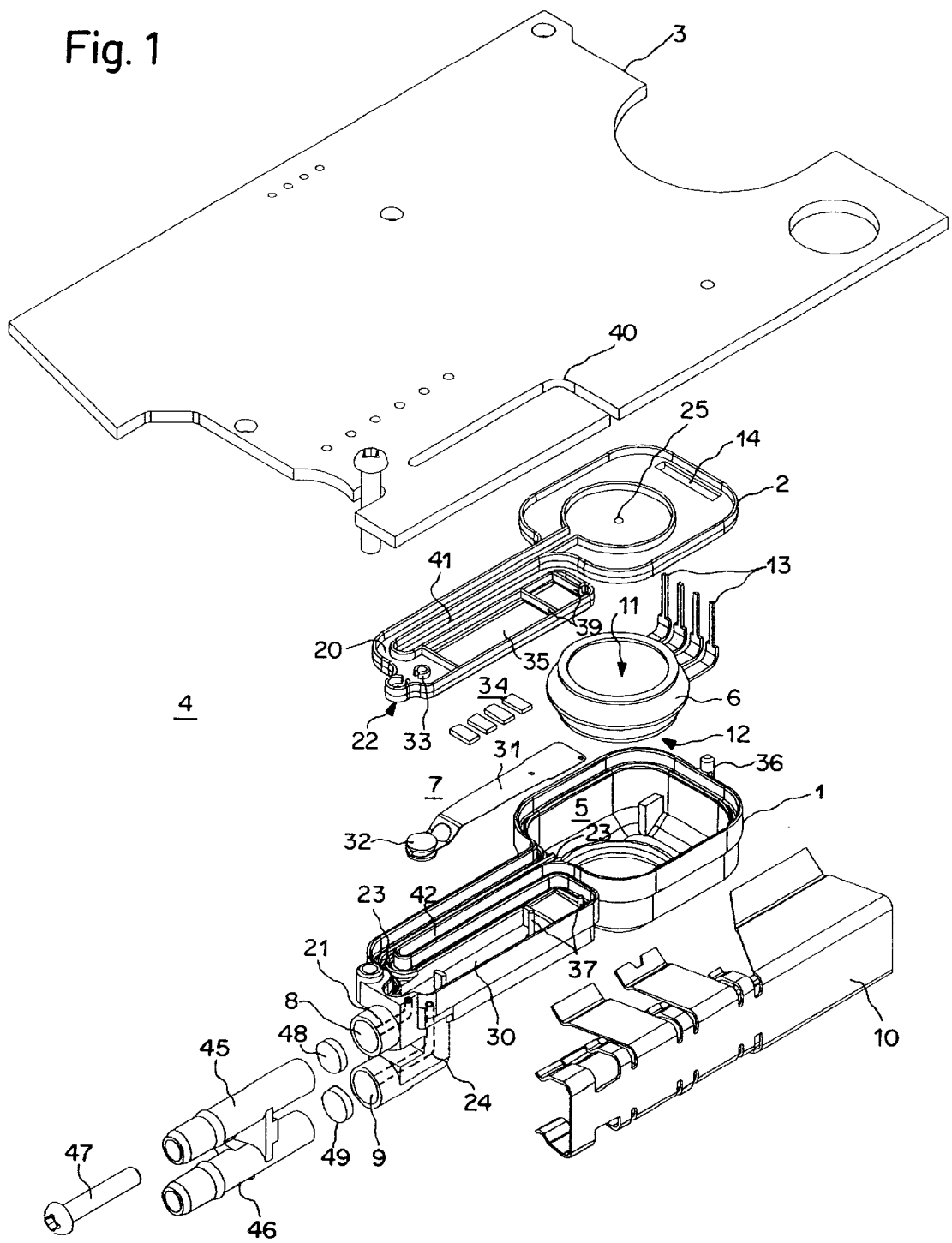
FIG. 1 shows an exploded view of an automatically compensatable device for measuring a pressure difference.

Referring to FIG. 1 reference numeral 1 therein denotes a housing cover which can be fixed by way of a sealing plate 2 to a circuit board 3 in such a way that the circuit board 3 and the housing cover 1 together with the sealing plate 2 disposed between the circuit board and the housing cover 1 form a housing 4. A sensor element 6 and a valve 7 are arranged in an internal space 5 in the housing 4. Provided on the housing cover 1 are a first connecting opening 8 and a second connecting opening 9 for a flow medium.

In an advantageous alternative embodiment the housing cover 1 and the circuit board 3 are held together by a clamping element 10, the clamping element 10 being of such a configuration that the sealing plate 2 is uniformly and gas-tightly clamped between the circuit board 3 and the housing cover 1.

The sensor element 6 is a differential pressure sensor having a first pressure-sensing side 11 and a second pressure-sensing side 12 and electrical connections 13. The electrical connections 13 are advantageously passed to the circuit board 3 through a first opening 14 in the sealing plate 2.

A first pressure feed passage 20 is accessible from the exterior by way of the first connecting opening 8, wherein the first connecting opening 8 is communicated with the first pressure feed passage 20 by way of a first duct 21 and a second opening 22 in the sealing plate 2. The sealing plate 2 is advantageously so designed that the first pressure feed passage 20 is formed and passed substantially between the circuit board 3 and the sealing plate 2.

A second pressure feed passage 23 is accessible from the exterior by way of the second connecting opening 9, wherein the connecting opening 9 is connected to the second pressure feed passage 23 by way of a second duct 24. The housing cover 1 and the sealing plate 2 are advantageously such that the second pressure feed passage 23 is shaped and passed substantially between the housing cover 1 and the sealing plate 2.

The sensor element 6 is arranged in the internal space 5 of the housing between the first pressure feed passage 20 and the second pressure feed passage 23 in such a way that the first pressure-sensing side 11 can be acted upon by a flow medium which enters at the first connecting opening 8 and the second pressure-sensing side 12 can be acted upon by a flow medium entering at the second connecting opening 9 so that a differential pressure obtaining between the first connecting opening 8 and the second connecting opening 9 can be detected by the sensor element 6.

The sealing plate 2 advantageously has a third opening 25, through which the first pressure feed passage 20 is taken to the first pressure-sensing side 11.

The valve 7 is designed and arranged to be controllable in such a way that a pressure difference between the two pressure-sensing sides 11 and 12 can be short-circuited by the valve 7.

In an advantageous embodiment of the device the valve 7 is disposed in a chamber 30 which is formed in the housing cover 1 and is in communication with the second pressure feed passage 23 and the second duct 24.

The valve 7 has a closure portion 32 which is movable about an arm 31 between two limit positions. In a first limit position a fourth opening 33 in the sealing plate 2 is sealingly closed by the closure portion 32. The fourth opening 33 goes from the first pressure feed passage 20 into the chamber 30.

In the second limit position the second duct 24 is closed by the closure portion 32 while the fourth opening 33 is open so that the two pressure-sensing sides II and 12 are short-circuited by the valve 7.

In an advantageous embodiment of the valve the closure portion 32 in its rest position is in the first limit position so that the sensor element 6 is in readiness for measuring the pressure difference obtaining between the two connecting openings 8 and 9. For that purpose the arm 31 is biased in such a way that the closure portion 32 in the rest position sealingly closes off the fourth opening 33. The arm 31 can be made from bimetal or shape memory alloy and is thus thermally deflectable so that the closure portion is movable under a thermal influence between the first and second limit positions.

In an advantageous embodiment the arm 31 is of bimetal and is indirectly heatable by a heating element 34. The heating element 34 is advantageously afforded by at least one heating resistor arranged on the circuit board 3 towards the arm 31. The sealing plate 2 has a cut-out 35 for heat transfer purposes in the region of the heating element 34.

An advantageous implementation of the heating element 34 comprises a series of heating resistors, which is arranged in the form of a surface mounted device (SMD) on the circuit board 3.

It will be self-evident that the thermally controlled movement of the closure portion 32 can in principle also be achieved by direct heating. Furthermore it will be self-evident that a movement of the closure portion 32 between the first and the second limit positions can also in principle be effected piezoelectrically, magnetically or in another known manner, by for example using a piezoelectric, electromagnetic, hydraulic or thermo-hydraulic actuators.

Thermal actuators and piezoelectric actuators can be implemented in the proposed device in such a way that the device can be particularly quiet in operation as the valve 7 which is integrated in the housing 4 requires only extremely small movements of the closure portion 32. A typical dimension for the required travel movement of the closure portion 32 between the first and second limit positions is about 0.3 millimeter.

The housing cover 1 is advantageously produced from plastic material using an injection-moulding procedure. Advantageously also a means 36 for correctly positioning the housing cover 1 in relation to the circuit board 3 and a means 37 for positioning the arm 31 are provided directly on the housing cover 1.

The sealing plate 2 is advantageously made of rubber or a soft plastic material. In an advantageous configuration of the sealing plate 2 ribs 39 for holding the arm 31 are provided directly on the sealing plate 2.

In embodiments of the thermally actuable valve 7 the device is advantageously designed in such a way that the pressure feed passage 20 or 23 between the sensor element 6 and the chamber 30 having the arm 31 is sufficiently long so that the thermally actuable arm 31 and the sensor element 6 are thermally sufficiently decoupled so that the sensor element 6 is not unacceptably heated by actuation of the valve. A compact design configuration for the device while nonetheless affording relatively long pressure feed passages 20 and 23 can be achieved by the zones of the housing cover 1, the sealing plate 2 and the circuit board 3, which carry the pressure feed passages 20 and 23 respectively, being designed in a loop-shaped configuration. An advantageous loop-shaped configuration for the device is afforded by substantially congruent incisions 40, 41 and 42 in the circuit board 3, the sealing plate 2 and the housing cover 1.

In an advantageous embodiment of the two connecting openings 8 and 9 they are designed with connecting nipples 45 and 46 which make it possible to provide for mechanical decoupling of the housing 4 from the environment thereof. The connecting nipples 45 and 46 can be fixed for example by a screw 47 to a body (not shown), and that provides for the above-mentioned decoupling effect in respect of the housing 4 from the body. Filters 48 and 49 respectively are advantageously disposed upstream of the connecting openings 8 and 9. When the flow medium is air, the filters 48 and 49 are dust filters.

The proposed device with the housing 4 including the circuit board 3 and the sensor element 6 disposed in the housing 4 and the valve 7 can be supplemented if required by further functional units which are advantageously arranged on the circuit board 3.

Figure 2:
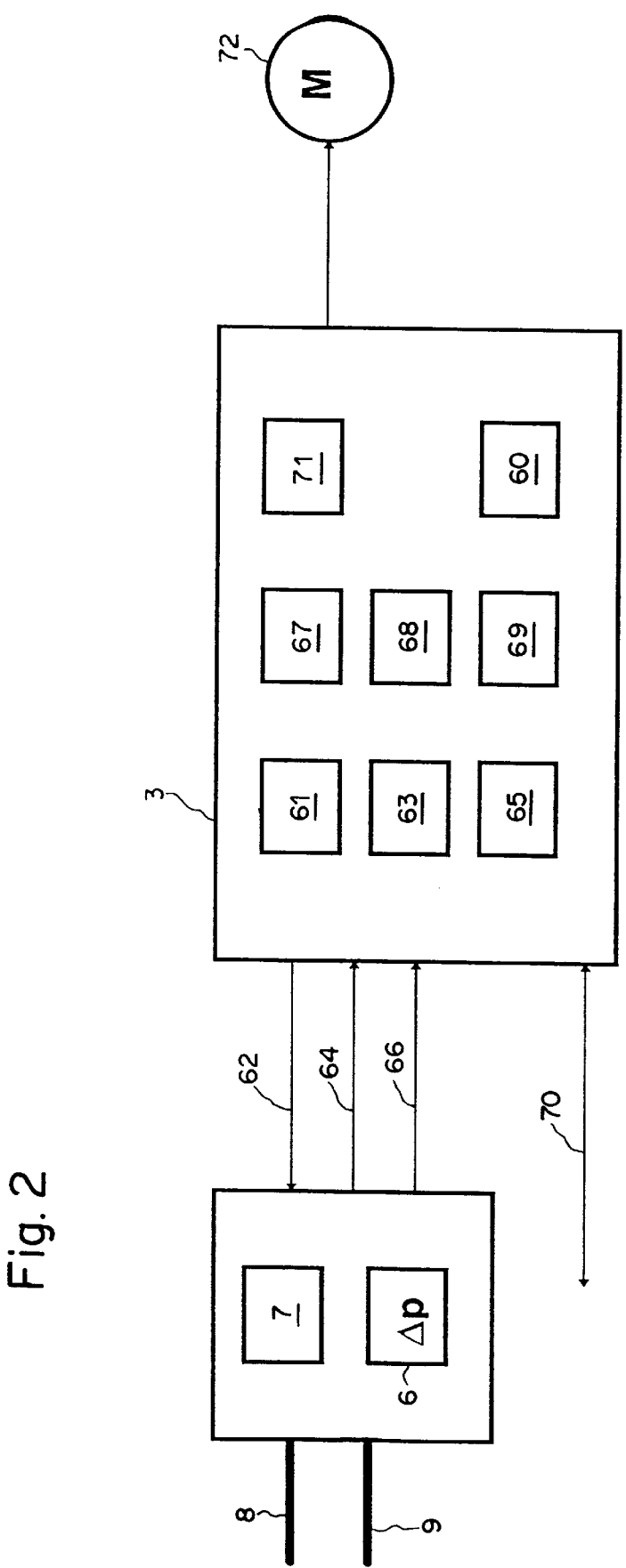
FIG. 2 shows a block circuit diagram of the device.

Referring to FIG. 2 disposed on the circuit board 3 by way of example are a power supply unit 60, valve control means 61 for generating a valve control signal 62, means 63 for obtaining a differential pressure signal from a first sensor signal 64, means 65 for obtaining a temperature signal from a second sensor signal 66, means 67 for automatically controlling a compensating procedure, means 68 for executing a regulating algorithm, means 69 for generating and/or evaluating communication signals 70 and an output driver 71 for a control member 72. The control member 72 is for example a fan motor. In particular the means 68 for executing a regulating algorithm can be parameterised by way of the communication signals 70.

Advantageously in particular the means 63 for obtaining a differential pressure signal, the means 65 for obtaining a temperature signal, the means 67 for automatically controlling a compensating procedure, the means 68 for executing a regulating algorithm and the means 69 for generating and/or evaluating communication signals are essentially implemented by a suitably programmed microprocessor or microcomputer arranged on the circuit board 3. If necessary also disposed on the circuit board is an application specific integrated circuit ASIC by means of which the functionality of the microprocessor or microcomputer can be enlarged.

Figure 3A:
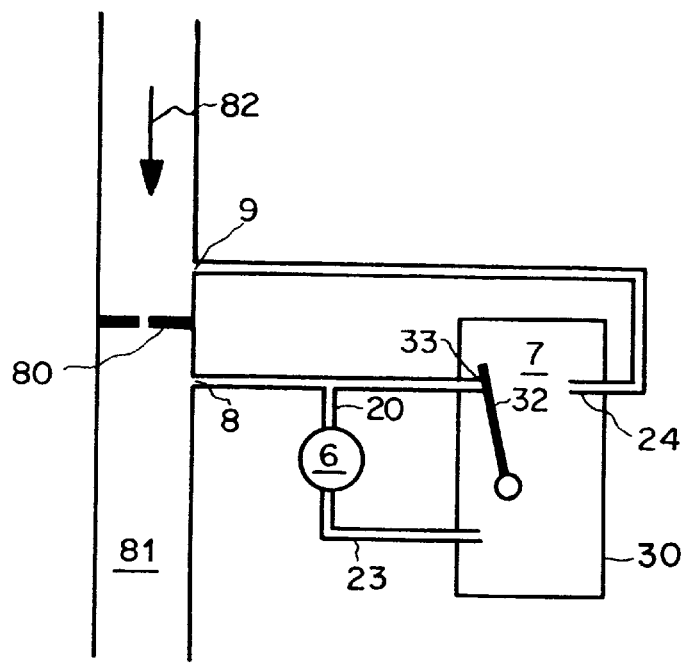
FIGS. 3a and 3b are diagrammatic views showing the principle of the device with functional elements thereof.
Figure 3B:
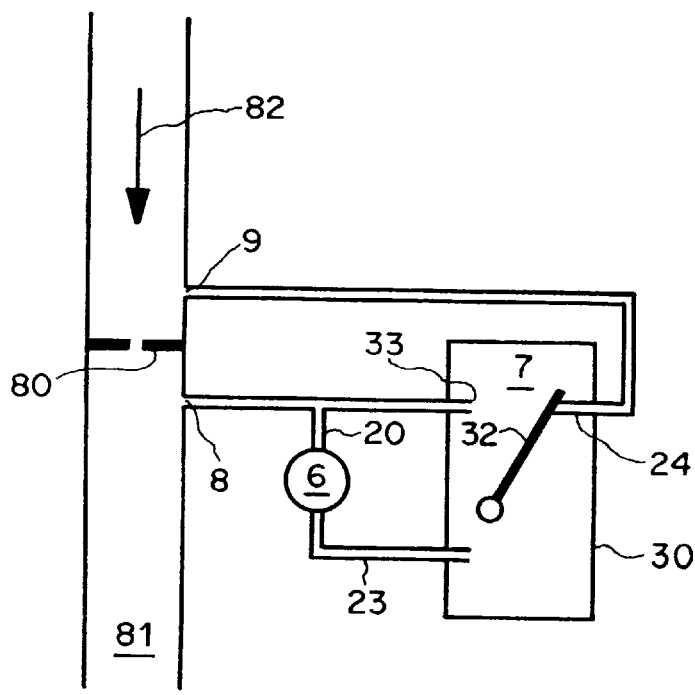

In FIG. 3a and FIG. 3b the two connecting openings 8 and 9 are communicated by way of an aperture or by way of a throttle element 80 with the flow medium 82 flowing in a line 81.

In FIG. 3a the closure portion 32 of the valve 7 is illustrated in the first limit position in which the sensor element 6 is in readiness for measuring the differential pressure across the aperture 80.

In FIG. 3b the closure portion 32 of the valve 7 is shown in the second limit position in which the sensor element 6 is short-circuited in relation to the applied static pressure and the pressure at the sensor element 6 is therefore zero. In that condition the sensor signal 64 (FIG. 2) is to be interpreted with differential pressure=0.

An advantageous process for automatically compensating or calibrating the device includes at least the following three process steps:

A first process step in which the valve control signal is generated, by which the closure portion 32 is moved into the second limit position (FIG. 3b).

A second process step in which the first sensor signal 64 is evaluated and a correction value for measured differential pressure values is ascertained and stored.

A third process step in which the valve control signal is generated, by which the closure portion 32 is moved into the first limit position (FIG. 3a).

The process for automatically compensating the device is if necessary implemented periodically or under certain preconditions by the means 67 for automatically controlling the compensating process.

When using certain types of sensor the sensor element 6 can advantageously be used both for measuring a differential pressure and also for measuring the temperature of the flow medium 81.

If the sensor element 6 is implemented for example by means of semiconductors, changes in temperature can be detected as resistance and/or voltage changes by evaluation of the second sensor signal 66.

To increase the level of measurement accuracy, the temperature of the flow medium 82 can also be taken into consideration if necessary when ascertaining the differential pressure.

We claim:

1. An automatically compensatable device for measuring a pressure difference, comprising:

a housing which has a first pressure feed passage and a second pressure feed passage, wherein the housing has a first connecting opening for a flow medium which is connected to the first pressure feed passage and a second connecting opening which is connected to the second pressure feed passage;

a sensor element with electrical connections, wherein the sensor element is disposed in the housing and is arranged between the first pressure feed passage and the second pressure feed passage in such a way that a pressure difference between the first connecting opening and the second connecting opening is detectable by the sensor element;

a valve disposed in the housing and having a closure portion by which a pressure difference across the sensor element can be short-circuited;

an actuator arranged in the housing and having electrical connections, for triggering a movement of the closure portion; and the housing including a housing cover, a circuit board and a sealing plate which is arranged between the circuit board and the housing cover, the first pressure feed passage being formed between the circuit board and the sealing plate.

2. A device according to claim 1, wherein the circuit board has electrical connections.

3. A device according to claim 1, wherein the second pressure feed passage is formed between the housing cover and the sealing plate.

4. A device according to claim 1, wherein the closure portion is thermally movable between two limit positions.

5. A device according to claim 1, wherein the closure portion is magnetically movable between two limit positions.

6. A device according to claim 1, wherein the closure portion is piezoelectrically movable between two limit positions.

7. A device according to claim 4, wherein the closure portion is movable by way of a bimetal spring.

8. A device according to claim 4, wherein the closure portion comprises an element of a shape memory alloy.

9. A device according to claim 4, wherein the housing includes a circuit board which has electrical connections and the thermal energy for movement of the closure portion is supplied indirectly by at least one heating resistor which is arranged on the circuit board.

10. A device according to claim 1, wherein the housing is fixed by a clamping element.

11. A device according to claim 2, wherein an electronic circuit is arranged on the circuit board, such that automatic calibration of the device can be effected.

12. A device according to claim 2, further comprising a mechanism for actuating a control member arranged on the circuit board.

13. A device according to claim 2, circuitry for processing communication data arranged on the circuit board.

14. A device according to claim 1, wherein the first pressure feed passage is defined by a structural configuration of said sealing plate.

15. A device according to claim 3, wherein at least one of the first and second pressure feed passages are defined by a structural configuration of said sealing plate.

16. A device according to claim 2, wherein a microcomputer is arranged on the circuit board, such that automatic calibration of the device can be effected.

17. A device according to claim 2, wherein a microprocessor is arranged on the circuit board, such that automatic calibration of the device can be effected.

* * * * *